United States Patent
Breston

[11] 3,708,819
[45] Jan. 9, 1973

[54] APPARATUS FOR DRYING PIPELINES

[76] Inventor: Michael P. Breston, 3643 Tartan, Houston, Tex. 77025

[22] Filed: June 5, 1970

[21] Appl. No.: 43,675

[52] U.S. Cl. .............................. 15/104.06 R, 134/8
[51] Int. Cl. ............................................. B08b 9/04
[58] Field of Search ....... 15/104.06 R, 104.06 A, 3.5; 118/DIG. 10, 105, 254, 408; 134/8

[56] References Cited

UNITED STATES PATENTS 3,600,736  8/1971  Smith et al. ................... 15/104.06 R Primary Examiner—Edward L. Roberts

[57] ABSTRACT

An apparatus capable of being propelled by a gas through a pipeline for drying the pipeline. The apparatus comprises a pipeline pig combined with a liquid pumping device. A portion of the propelling gas enters the pumping device which includes means to increase the velocity and decrease the pressure of the admitted gas. This pressure decrease is used to dynamically lift any liquid which may enter the pumping device. The motive gas mixes with the lifted liquid to form a fine spray which is ejected in front of the moving pig into the downstream section of the pipeline.

7 Claims, 3 Drawing Figures

PATENTED JAN 9 1973
3,708,819
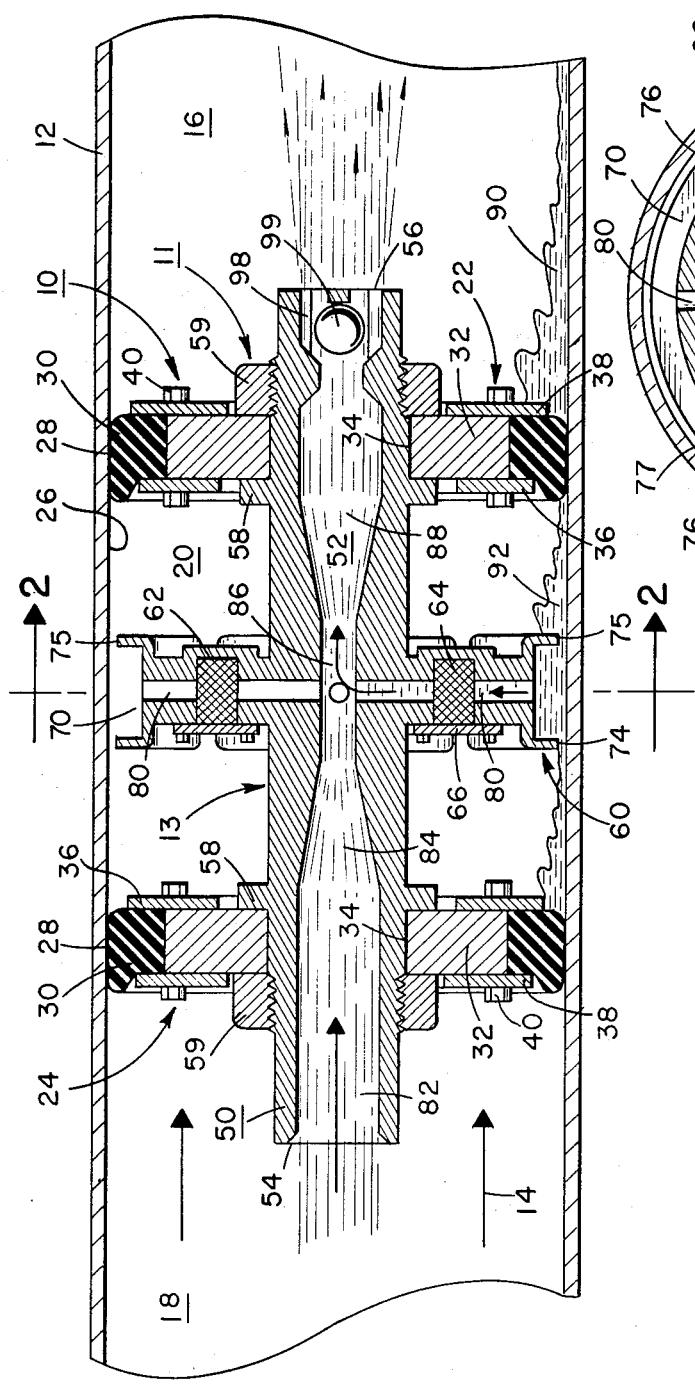
FIG. 1.
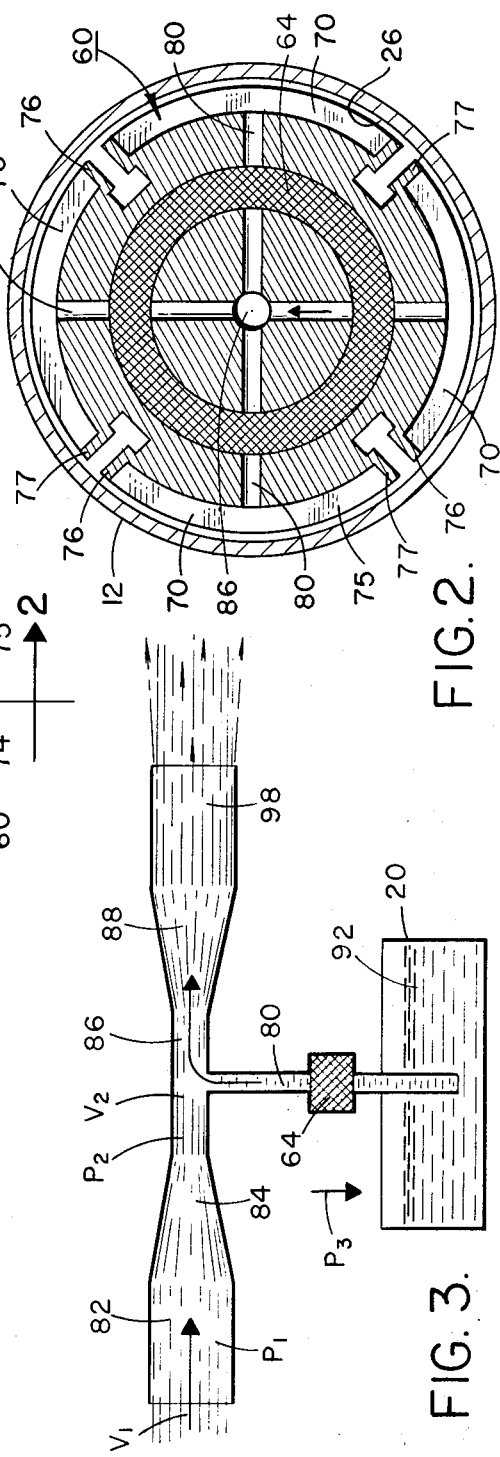
FIG. 2.
FIG. 3.
INVENTOR.
MICHAEL P. BRESTON

APPARATUS FOR DRYING PIPELINES

BACKGROUND OF THE INVENTION

To dry fluid-carrying pipelines of liquids, it is common practice to use a pipeline pig. Various pipeline pigs are known to the art.

A typical pig includes at least one plug which is propelled through the pipeline by a pressurized gas. The moving pig divides the pipeline into an upstream and downstream section. The object of the pig is to push the liquid downstream for removal of the liquid through a suitable outlet.

In practice, it is difficult for the moving pig to maintain an effective sliding seal between the upstream and downstream sections of the pipeline. Accordingly, some liquid bypasses the outer peripheral wall of the pig and moves in the opposite direction from the downstream to the upstream section of the pipeline. For these and other reasons, several passes of the pig through the pipeline are required to completely dry the pipeline. Each journey of the pig through the pipeline is both time consuming and expensive.

SUMMARY OF THE INVENTION

This invention contemplates combining a pumping device with a pipeline pig. The pig is provided with at least one liquid suction stage which automatically removes unwanted liquid which bypasses the pig. The liquid is removed by and mixed with the pig-propelling pressurized gas. The gas-liquid spray is ejected into the downstream section of the pipeline in the direction of gas flow.

In a preferred embodiment of the invention, the pig comprises at least two plugs. Each plug has a resilient member with an outer surface which, in use, engages the inner wall of the pipeline. The plugs are maintained in longitudinal, spaced-apart relation so that, in use, the plugs define a suction chamber with the pipeline. Inside this chamber is a suction pump which includes a Venturi tube having a gas converging nozzle followed by a throat which serves as a gas-liquid mixing chamber. Attached at an angle with the throat section is a liquid suction device to lift any liquid which may be contained in the suction chamber. The lifted liquid is then mixed with the motive gas flowing through the Venturi tube. After the throat is a divergent zone to allow the mixed fluid to expand as a spray. This spray is ejected in front of the moving pig in the direction of fluid flow.

The lifting of the liquid from the suction chamber is predicated on the establishment of a low-pressure zone in the throat section relative to the pressure in the suction chamber. In using the suction effect of the motive gas, a pipeline can be dried effectively and with a minimum number of passes of the pig through the pipeline.

BRIEF DESCRIPTION OF THE DRAWINGS

For a better understanding of the invention, and to show how the same can be carried into effect, reference will now be made, by way of example, to the accompanying drawings wherein the same reference characters designate similar parts and in which:

FIG. 1 is a longitudinal cross section of a preferred embodiment of the apparatus of the present invention;

FIG. 2 is a view taken on line 2—2 of FIG. 1; and

FIG. 3 is useful in describing the operation of the suction effect.

The apparatus of this invention is generally designated as 10 and is shown moving inside a pipeline 12 under the influence of a pressurized gas. Apparatus 10 includes a pig 11 and a pump 13, both integrally combined to dry the pipeline 12. The pressurized gas flows in the direction of arrows 14. Apparatus 10 divides the pipeline into a downstream section 16 and an upstream section 18. Inside apparatus 10 is a suction chamber 20.

The volume of chamber 20 is defined between a front plug 22, a rear plug 24, and the inner cylindrical wall 26 of pipeline 12. Each plug has an outer cylindrical wall 28 formed by a cup-shaped member 30. Member 30 is mounted on the outer cylindrical wall of a center spacer 32 having a center bore 34. Member 30 and spacer 32 are mounted between two plates 36 and 38 securely fastened together by bolts 40.

Plugs 22 and 24 are held in spaced-apart positions by a longitudinal member 50. Member 50 has a bore 52 which fluidly communicates at one end 54 with the upstream section 18 and at the other end 56 with the downstream section 16. Member 50 extends through the center hole 34 of each spacer 32. Each spacer is mounted on the outer periphery of member 50 between a radially-extending shoulder 58 and a threadedly-secured nut 59.

Extending at an angle from member 50 is a liquid-suction device, generally designated as 60. The body of device 60 can form integral part with the body of member 50. In a circular channel 62 of device 60 is positioned a filter element 64 of stainless steel or bronze secured in place by a removable plate 66. The outer periphery of suction device 60 is divided into four channels 70. Each channel is formed by two radially-extending walls 74 and 75 and axially-extending walls 76 and 77. Each channel 70 fluidly communicates with bore 52 through a narrow liquid passage 80. The number of channels 70 and liquid passages 80 may be less or more than four, as will be apparent to those skilled in the art.

The bore 52 includes a gas-entry portion 82, a gas-converging portion 84, a throat or fluid-mixing chamber 86, a fluid-diverging portion 88, and a fluid-exit portion 98. Inside exit portion 98 is positioned a uni-directional fluid-flow device, such as a check valve 99 to allow fluid to exit from, but not enter into, exit portion 98.

The operation of apparatus 10 will be described with particular reference to FIGS. 1 and 3. The object of pig 11 is to move the liquid pool 90 in front of pig 11 with the front plug 22 to a downstream fluid outlet (not shown). While it is desired for the outer cylindrical walls 28 of plugs 22 and 24 to form a perfect sliding seal with the inner cylindrical wall 26 of pipeline 12, in practice such seals are difficult to establish and/or maintain. Accordingly, a portion of the liquid pool 90 will bypass the resilient rim 30 and enter into chamber 20. It is the object of the pumping device 13 to pump out whatever body of water 92 there may be in chamber 20.

The effects of constricted, fluid-flow channels are well known. In fact, the pumping device 13 is sometimes variously referred to in the art as: a Venturi pumping device, a jet pump, a suction pump, etc. If the gas velocity is $V_1$ and the gas pressure is $P_1$ in the entry zone 82, then the velocity will increase and the pressure will drop, as the gas passes through the converging section 84 into the throat 86. In the throat 86 the gas velocity is $V_2$ and is higher than $V_1$, and the gas pressure is $P_2$ and is lower than $P_1$. The gas in the converging portion 84 is therefore accelerated. This acceleration is caused by a force due to the pressure difference $(P_1 - P_2)$.

The gas pressure $P_3$ inside chamber 20 is slightly lower than the gas presure $P_1$ in the upstream section 18, since there is a small pressure drop across moving plug 24. But, the pressure $P_3$ is greater than the pressure $P_2$ in the throat section 86. Therefore, the pressure difference $(P_3 - P_2)$ is used to cause or induce the flow of water 92 into the throat 86 through one or more of the feeding channels 80. The filter element 64 removes dirt and debris from the liquid 92 as it flows into the gas-liquid mixing chamber 86.

In sum, the gas pressure $P_3$ acting on the free level of the liquid body 92 in chamber 20 causes liquid 92 to rise into the liquid-suction device 60. The gas, therefore, serves to (1) propel pig 11 through the pipeline 12 and thereby push the liquid pool 90 to a downstream outlet, and (2) establish a suction effect at the constriction in throat 86 to allow apparatus 10 to act as a suction pump.

The spray-drying method of this invention involves atomizing the body of water 92 into very small droplets dispersed in an atmosphere of gases in the diverging section 88. When the water column in bore 80 is lifted up to the throat 86, it it sheared or cut into small droplets which become suspended and intimately dispersed in the flowing gas stream. This suspension is passed through the divergent zone 88, the exit zone 98 and into the downstream section 16. This suspension is believed to expose considerable surface area of the water droplets to the gas and premotes rapid vaporization of the water. At some point downstream, the gas vapors can be made to pass through a liquid condenser for removing the water from the gas, if the employed gas is to be reused. Ordinarily air or nitrogen are employed and no such condensation is necessary.

Water particles of predetermined size can be obtained by adjustment of the ratio of the rate of flow of the gas to the rate of flow of the water 92 through bore 80. This ratio is best determined experimentally for each particular pipeline size and pig dimensions.

There are many advantages to be obtained from using a multi-stage suction system center. two or more suction chambers 20 and with three or more plugs, such as plugs 22 axially-spaced-apart in the interior of the pipeline. One major advantage to be derived from a multi-stage suction system is that the drying efficiency is greatly increased. Another variation would include using hot gases to promote greater drying efficiency. The process and apparatus of this invention is not limited to the drying of water. A wide variety of liquids can be dried in the manner previously described.

Although the preferred embodiment of the pig was described as preferably having two transverse plugs or sealing walls 22 and 24 for establishing therebetween a liquid-suction chamber 20, it will be appreciated that the pig, if desired, may include only one sealing wall 22, and the liquid suction means 60 would maintain fluid communication between the quantity of liquid 92 and the liquid-mixing chamber 86 to cause particles of the liquid to be drawn into and entrained by the gas stream flowing through the channel 52 in the Venturi tube 50. Other modifications will become readily apparent to those skilled in the art and it is intended for all such modifications to come within the scope of the claims attached hereto.

What I claim is:

1. A pig for removing liquids from a pipeline, the pig having at least one movable transverse sealing wall disposed in the interior of and dividing the pipeline into an upstream section and a downstream section;

said wall providing an external surface which establishes a movable seal with the interior wall of said pipeline;

said pig being propelled through said pipeline by a pressurized gas whereby most of the liquid in front of said wall is moved by said wall downstream and a quantity of said liquid remains or enters upstream behind said wall, the improvement comprising:

means including a Venturi tube for establishing a fluid-flow channel to allow a gas stream to flow from the upstream section into the downstream section, said channel providing a fluid-mixing chamber wherein the pressure of the gas stream becomes reduced; and liquid-suction means in fluid communication with said fluid-mixing chamber to cause particles of said quantity of liquid to be drawn into and entrained by said gas stream flowing through said chamber, whereby a gas-liquid mixture from said fluid-mixing chamber is ejected downstream.

2. The pig of claim 1 and further including:

at least another movable transverse sealing wall, said another wall providing an external surface which establishes a movable seal with the interior wall of said pipeline, said wall being maintained in axially-spaced relationship to form a liquid-suction chamber between said walls and the interior wall of said pipeline, said liquid-suction chamber containing said quantity of liquid; and said liquid-suction means allowing said suction chamber to fluidly communicate with said fluid-mixing chamber.

3. The pig of claim 1 wherein, said Venturi tube defines a convergent gas passage to provide the pressure reduction in said fluid-mixing chamber.

4. The pig of claim 3 wherein, said fluid-mixing chamber in said Venturi tube is followed by a divergent gas passage in said channel to provide a pressure buildup for assisting in the ejection of the entrained liquid from said liquid-suction chamber to said downstream section.

5. The pig of claim 4 wherein, said liquid-suction means defines at least one liquid conduit to provide a passage for said quantity of liquid into said fluid-mixing chamber.

6. The pig of claim 4 wherein, said liquid-suction means defines a plurality of radially-displaced liquid conduits to allow liquid to be lifted from said suction chamber into said fluid-mixing chamber irrespective of the orientation of said pig as it moves through said pipeline.

7. The pig of claim 6 wherein,
said liquid-suction means includes filter means for removing dirt from said quantity of liquid before it enters into said fluid-mixing chamber.

* * * * *